United States Patent Office 3,306,878
Patented Feb. 28, 1967

3,306,878
TRIOXANE POLYMERIZATION PROCESS
John Michael Barton, Gainesville, Fla., and Alaric Louis Jeffrey Raum, Effingham, Surrey, England, assignors to The Distillers Company Limited, Edinburgh, Scotland, a British company
No Drawing. Filed Dec. 3, 1963, Ser. No. 327,822
Claims priority, application Great Britain, Dec. 15, 1962, 47,407/62
4 Claims. (Cl. 260—67)

The present invention relates to the production of polyoxymethylenes. In particular it relates to the polymerisation and copolymerisation of trioxane to give high molecular weight polymers.

According to the present invention the process for the preparation of polymers and copolymers comprises polymerising or copolymerising trioxane in the presence of a polymerisation catalyst comprising a complex formed from ferric acetylacetonate and an organic acid halide.

The preferred organic acid halides are the chlorides and the preferred organic radicals are acetyl and benzoyl. Suitable organic acid halides are acetyl chloride, acetyl bromide and benzoyl chloride.

The complex can be prepared by mixing the ferric acetylacetonate and the organic acid halide either in solution in an inert solvent or in the absence of solvent. The components may be mixed in the reaction mixture containing the trioxane which is to be polymerised.

The molar ratio of the organic acid halide to the ferric acetylacetonate should be greater than 1:1 and preferably between 2:1 and 4:1, more particularly 3:1.

Preferably the complex catalyst is employed in a concentration of 0.0005% to 1.0% by weight based on the weight of trioxane, together with any copolymerisable material present, when using a batch polymerisation. In a continuous-feed polymerisation, the concentration of the catalyst (in grams) based on the volume of the reaction medium (in millilitres) is preferably within the range 0.0005% to 1% w./v.

Polymerisation occurs over a wide range of temperatures, for instance between −20° C. and 120° C. At temperatures above about 100° C., which is near the ceiling temperature of polyformaldehyde, it is necessary to carry out the process of the present invention under increased pressure for polymerisation to occur.

The polymerisation may be carried out by any of the known techniques for polymerising trioxane. For example, the trioxane may be polymerised in bulk, i.e., in the molten state, in solution or as a dispersion in an inert liquid vehicle. If the polymerisation is carried out in solution, any of the known solvents for trioxane which are suitable for cationic polymerisation may be employed, for example cyclohexane or 1,2-dichloroethane.

The polymerisation reaction is preferably carried out under completely anhydrous conditions. Small amounts of water may not prevent polymerisation although they may lower the molecular weight of the product. The molecular weight of the formed polymer or copolymer may be controlled by the presence in the reaction mixture of a chain transfer agent other than water which is suitable for use in a cationic polymerisation system.

The polymerisation can be carried out in a continuous feed process or as a batch process. The reaction mixture can also contain dispersing agents for the formed polymer or copolymer if it is insoluble in the reaction medium. The polymer or copolymer produced by the process of the present invention can be isolated by any of the techniques which have been developed for the isolation of polymers and copolymers derived from trioxane or formaldehyde. Usually the polymer or copolymer is formed as a solid suspension which can be washed with a liquid medium such as ethyl alcohol. The washing can be carried out for example, by extraction of the polymer or copolymer in a Soxhlet type of apparatus, by maceration of the polymer or copolymer under the washing liquid or by heating or refluxing the liquid containing a suspension or solution of the polymer or copolymer. A washing stage may be included in which the polymer is washed with a solution of a compound which forms a soluble complex with the iron present in the catalyst. Any combination of these methods may be used.

It is also advantageous to include a washing stage with a basic liquid, to remove any residual catalyst or other acidic contaminants. The basic liquid may be an aqueous alkaline solution or a solution of an organic base in a non-aqueous solvent. The solvent used may be a solvent for the polymer or copolymer at an elevated temperature. It is preferred that the solvent used should at least be a swelling agent for the polymer or copolymer. Examples of suitable washing liquids are aqueous sodium bicarbonate solution or a solution of tributylamine or n-butylamine in ethanol. A very useful solution is tributylamine in toluene.

The washing steps in the isolation of the product can be carried out for example, by extraction of the polymer or copolymer under the basic liquid or by heating or refluxing the liquid containing a suspension or solution of the polymer or copolymer.

The polymers and copolymers produced according to the present invention may be stabilised by the addition of any of the known stabilising agents for polyoxymethylenes and copolymers of trioxane or of formaldehyde. They may also be esterified by reaction with carboxylic acids or anhydrides or etherified to give highly stable products. Suitable examples of this reaction are acetylation or propionation using the appropriate anhydrides. When the products are acylated the reaction can suitably be carried out at an elevated pressure. The polymers and copolymers can also be stabilised by treatment with isocyanates or diisocyanates or any other compound which is known to react with the end-groups of such polymers or copolymers to increase their stability.

The following examples illustrate the process of the present invention.

*Example 1*

25 millilitres of a solution of trioxane in ethylene dichloride containing 15.0 grams of trioxane were mixed with 0.260 gram of ferric acetylacetonate in a dry tube under a dry nitrogen atmosphere. 0.5 millilitre of acetyl chloride was then added to the tube, and polymer began to form rapidly. The tube was then placed in a water bath at 40° C., and rotated in the bath for 21.5 hours. 20 millilitres of ethanol were then added to the tube, and the polymer was broken up and filtered off. After washing with acetone, hot water, then again with acetone, and drying in a vacuum oven at 50° C., for about 2 hours, the yield of polymer was found to be 12.7 grams.

*Examples 2 to 7*

The examples described in the table below were carried out in stirred glass reactors under nitrogen using a solution of trioxane in ethylene dichloride containing 5.57 moles trioxane per litre of solution. Polymerisations were terminated by adding tributylamine and the polymers were isolated by macerating in ethanol, filtering, washing first with water, then with acetone and drying under vacuum at 50° C.

| Example | Fe$^{III}$ acetyl acetonate mmole/l.$^{-1}$ | Acetyl chloride mmole/l.$^{-1}$ | Temp., ° C. | Time, hrs. | Yield of polymer, percent |
|---|---|---|---|---|---|
| 2 | 2.8 | 5.6 | 18 | 19 | 67.8 |
| 3 | 2.8 | 8.4 | 20 | 20 | 52.7 |
| 4 | 2.8 | 8.4 | 20 | 66 | 73.7 |
| 5 | 2.8 | 5.6 | 70 to 80 | 0.4 | 68.6 |
| 6 | 2.8 | 8.4 | 72 | 0.1 | 74.2 |
| 7 | 0.75 | 1.50 | 70 to 78 | 0.5 | 62.6 |

By way of contrast Example 5 was repeated without the acetyl chloride as follows:

A solution of ethylene dichloride containing 5.57 moles per litre of trioxane and 2.8 millimoles per litre of ferric acetylacetonate was stirred and held at 70° C. under nitrogen for six days. No polymer was formed in this time.

We claim:
1. A process for the production of trioxane polymers which comprises polymerising trioxane at a temperature of from −20° C. to 120° C. in the presence of a polymerisation catalyst comprising a complex formed from ferric acetylacetonate and an organic acid halide selected from the group consisting of acetyl chloride, acetyl bromide and benzoyl chloride, the molar ratio of organic acid halide to ferric acetylacetonate being in the range of from 1:1 to 4:1, and recovering the polymers formed.

2. A process according to claim 1 wherein the process is a batchwise process and the catalyst is employed in a concentration of 0.0005% to 1.0% by weight based on the weight of trioxane.

3. A process according to claim 1 wherein the process is a continuous feed process and the catalyst is employed in a concentration of 0.0005% to 1.0% based on the volume of the medium employed.

4. A polymerisation catalyst suitable for use in polymerising trioxane which comprises a complex formed from ferric acetylacetonate and an organic acid halide selected from the group consisting of acetyl chloride, acetyl bromide and benzoyl chloride.

References Cited by the Examiner
UNITED STATES PATENTS 2,775,563  12/1956  Wiczer _____ 260—439
3,088,955  5/1963   Foos et al. _____ 260—439
3,111,503  11/1963  O'Connor et al. _____ 260—67

WILLIAM H. SHORT, *Primary Examiner.*

L. M. MILLER, *Assistant Examiner.*